No. 672,400. Patented Apr. 16, 1901.
J. T. ROBBINS.
HOT WATER FURNACE.
(Application filed July 6, 1900.)

(No Model.) 3 Sheets—Sheet 1.

Witnesses:
R. H. Orwig
R. G. Orwig

Inventor: Joseph T. Robbins
By Thomas G. Orwig,
Attorney.

No. 672,400.  
J. T. ROBBINS.  
HOT WATER FURNACE.  
(Application filed July 6, 1900.)  
(No Model.)  
Patented Apr. 16, 1901.  
3 Sheets—Sheet 2.

Witnesses:  
R. H. Orwig  
R. G. Orwig

Inventor: Joseph T. Robbins  
By Thomas G. Orwig, Attorney

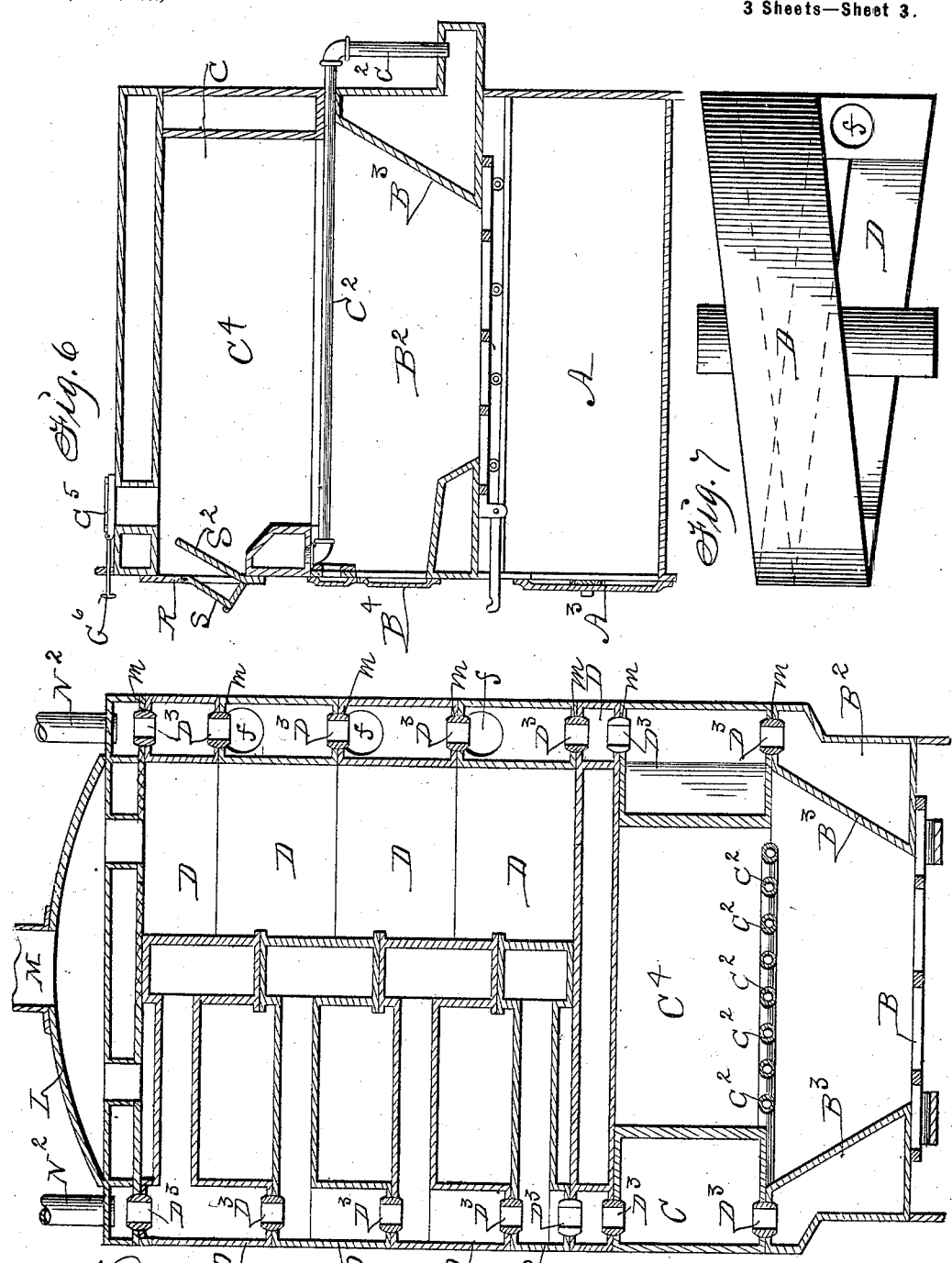

UNITED STATES PATENT OFFICE.

JOSEPH T. ROBBINS, OF DES MOINES, IOWA.

HOT-WATER FURNACE.

SPECIFICATION forming part of Letters Patent No. 672,400, dated April 16, 1901.

Application filed July 6, 1900. Serial No. 22,671. (No model.)

*To all whom it may concern:*

Be it known that I, JOSEPH T. ROBBINS, M. D., a citizen of the United States, residing at Des Moines, in the county of Polk and State of Iowa, have invented a new and useful Hot-Water Furnace, of which the following is a specification.

My object is to improve the construction, durability, and efficiency of that class of furnaces that are designed to heat and circulate steam and water through radiators for warming buildings.

My invention consists in the construction, arrangement, and combination of parts, as hereinafter set forth, pointed out in my claims, and illustrated in the accompanying drawings, in which—

Figure 2:
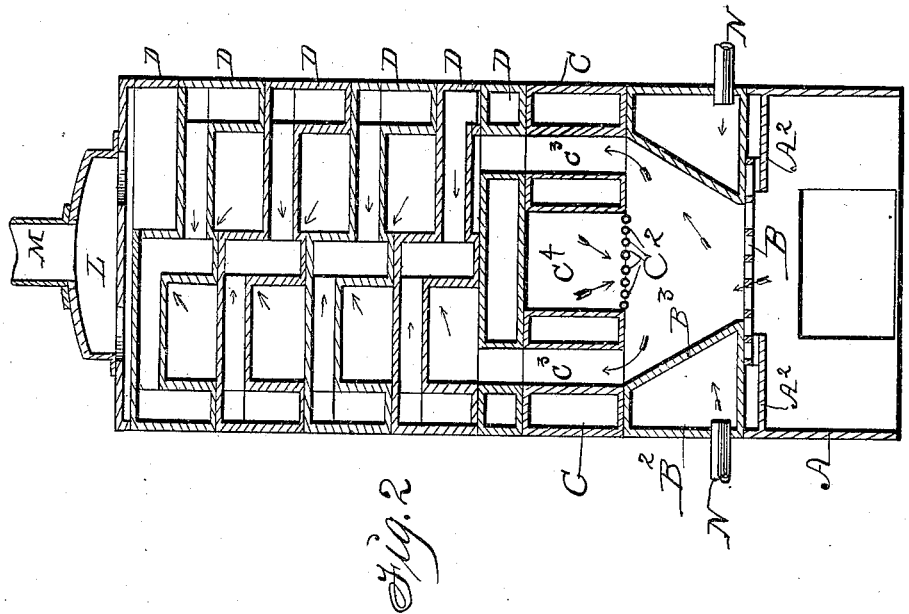
Figure 1:
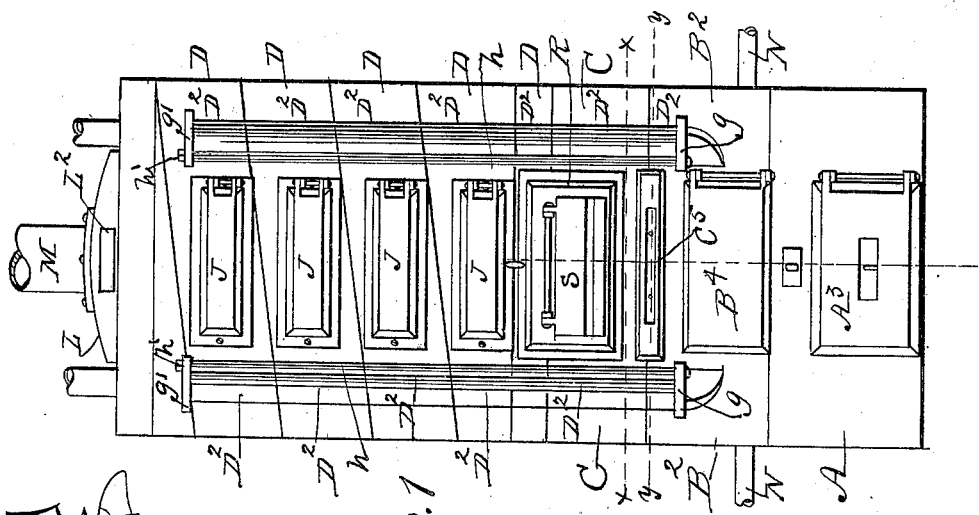
Figure 3:
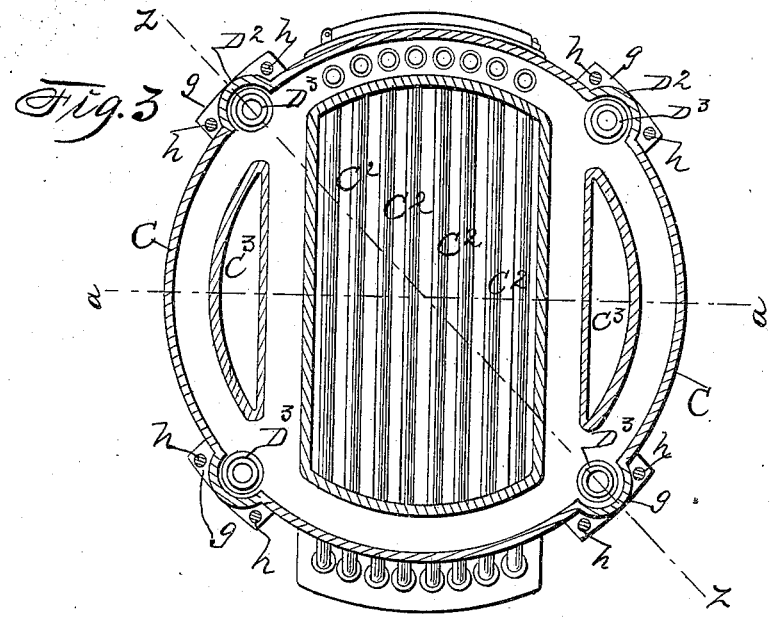
Figure 4:
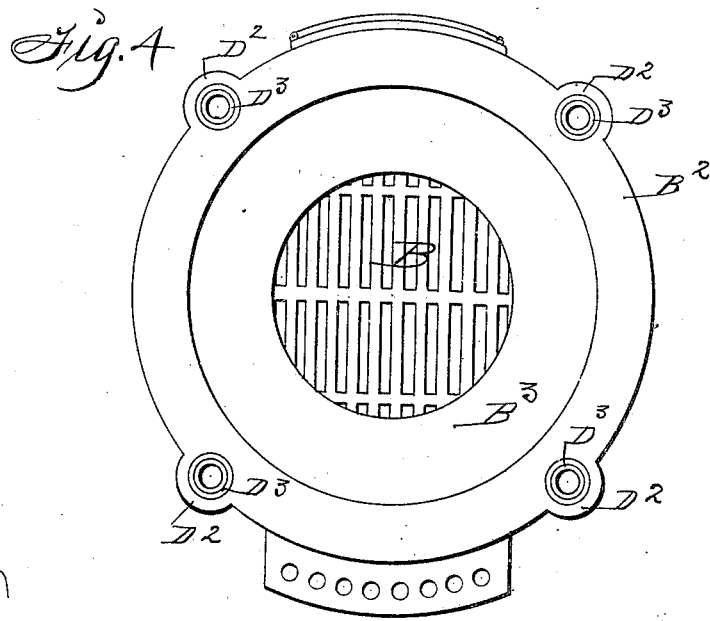

Figure 1 is a front elevation of my furnace. Fig. 2 is a transverse longitudinal sectional view of Fig. 1, showing the interior construction and relative positions of different operative parts. Fig. 3 is an enlarged transverse sectional view on the line $xx$ of Fig. 1 looking downward. Fig. 4 is an enlarged transverse sectional view on the line $yy$ in Fig. 1 looking downward. Fig. 5 is a vertical central sectional view on the line $zz$ of Fig. 3, showing the overlying boiler-sections connected as required to produce a spiral water and steam passage above the annular reservoir above the grate. Fig. 6 is a vertical central sectional view on the line $aa$ of Fig. 3, showing the door through which fuel is passed to the fire-pot and a door for feeding air to the combustion-chamber. Fig. 7 is a side view of a spiral boiler-section.

The letter A designates the cylindrical cast-metal bottom portion of the furnace, preferably cast complete in one piece.

$A^2$ is an interior annular flange adapted to support a grate.

$A^3$ is a door through which access is gained to the ash-pit under the grate.

B is a grate placed on the flange $A^2$ in the top portion of the part A and upon rollers, as shown in Fig. 6, and provided with a handle for shaking the grate.

$B^2$ is a boiler-section preferably cast complete in one piece and fitted on top of the bottom portion A. Its annular inner wall $B^3$ is inclined to produce a fire-pot or combustion-chamber that is open at its top and bottom.

$B^4$ is a door at its front that closes a passage through the section $B^2$ for introducing fuel into the fire-pot or combustion-chamber.

$B^5$ is a rear extension of the boiler-section $B^2$, adapted for connecting tubes therewith to establish communication with a combined boiler-section and fuel-chamber fitted on top of the boiler-section $B^2$, as shown in Fig. 6.

C is a boiler-section cast complete in one piece and fitted on top of the section $B^2$. A plurality of tubes $C^2$ are placed between the top of the boiler-section $B^2$ and the section C to establish communication between these two boiler-sections in such a manner that the products of combustion descending from the fuel-chamber will envelop the tubes $C^2$, and thereby facilitate heating water in the boiler-sections. The tubes $C^2$ also serve as a grate at the bottom of said fuel-chamber. Flues $C^3$ extend vertically in the section C, as shown in Figs. 2 and 3, and in the center of the section is a fuel-chamber $C^4$. A door $C^5$ closes a passage through which access is gained to the tubes $C^2$ of the grate at the bottom of the fuel-chamber $C^4$.

A plurality of cast-iron spiral boiler-sections D are fitted together on top of the boiler-section C, as shown in Figs. 1, 2, and 5, in such a manner as to produce a spiral upward passage-way for water and steam within the communicating boiler-sections and also a spiral passage-way or flue for the products of combustion descending from the combustion-chamber $C^4$ and then rising from the fire-pot B in the center of the lower section $B^2$. Each of these boiler-sections D has four integral swells $D^2$, adapted to be placed in coinciding positions to produce continuous passages for water and steam between all the boiler-sections by means of openings $f$ in their ends (shown in Figs. 5 and 7) in each section D as required to produce communication between them.

Flanges $g$ on the boiler-section $B^2$ and corresponding flanges $g'$ on the upper boiler-section D, as shown in Fig. 1, have coinciding apertures through which rods $h$ are extended and fastened by means of nuts $h'$ on their ends as required to clamp all the boiler-sections together securely. It is obvious suitable packing may be placed between the boiler-sections to produce air-tight joints.

To establish steam-tight joints between the overlying sections B², C, and D, coinciding openings in their overlying swell portions are concaved or tapering, and open-ended couplings D³, having convex or tapering exterior surfaces, are driven into the coinciding openings m of the overlying parts, as shown in Fig. 5.

Each boiler-section D is provided with a door J for gaining access to the interior flue that extends upward from the lower boiler-section B² through the top of the furnace.

The lower boiler-section D has a vertical opening, as shown in Fig. 3, over which is placed a sliding damper C⁵, that has a handle C⁶, extending outward in such a manner that the said vertical opening can be uncovered whenever it is desired to produce a direct upward draft from the fuel-chamber C⁴ in the boiler-section C. It also has openings coinciding with the openings C³, as shown in Fig. 2.

The upper boiler-section has openings, as shown in Fig. 5, through which the products of combustion pass upward into the dome L. The dome L is provided with a door L².

M is a smoke-flue fixed to the top of the dome L.

Induction-tubes N are fixed in the lower boiler-section B², and eduction-tubes N² are fixed in the upper boiler-section D in such a manner that these tubes may be extended to and connected with radiators as required to circulate hot water and steam through the radiators.

A door R is hinged to the boiler-section C to gain access to the fuel-chamber C⁴, and S is an auxiliary or draft door hinged to the door R to close an opening in said door, and S² is a fixed deflector to direct air from the exterior inward and to prevent products of combustion from escaping outward.

Having thus described the construction, function, arrangement, and combination of all the parts, the practical operation and utility of my invention will be readily understood by persons familiar with the art to which it pertains.

What I claim as new, and desire to secure by Letters Patent, is—

1. In a boiler-furnace, a boiler-section having an open-ended interior adapted for use as a fire-pot and openings in the top of the boiler-section that surrounds the fire-pot adapted for establishing communication with a series of boiler-sections fitted together on top of said boiler-section in the manner set forth for the purposes stated.

2. In a boiler-furnace, a boiler-section having an integral central fuel-chamber, flues extending vertically through the boiler-section at the sides of the fuel-chamber, an opening in the front of the boiler-section for the passage of fuel to the fuel-chamber and an extension at the rear of the boiler-section for connecting tubes therewith to establish communication with a boiler-section fitted on top of said combined boiler-section and fuel-chamber, as shown and described for the purposes stated.

3. In a boiler-furnace, a boiler-section having an integral central fuel-chamber, flues extending vertically through the boiler-section at the sides of the fuel-chamber, an opening in the front of the boiler-section for the passage of fuel to the fuel-chamber and an extension at the rear of the boiler-section for connecting tubes therewith to establish communication with a boiler-section fitted on top of said combined boiler-section and fuel-chamber, a boiler-section fitted on top of said boiler-section having an integral fuel-chamber and a plurality of tubes connected with the two boiler-sections, as shown and described for the purposes stated.

4. In a boiler-furnace, a plurality of boiler-sections each having four integral outward swells placed in coinciding position and provided with coinciding openings communicating with each other as shown and described to produce a spiral or serpentine passage for water and steam and also a spiral flue for products of combustion.

5. In a boiler-furnace, overlying spiral boiler-sections each having integral outward swells and coinciding openings in their mating ends and apertures in the tops and bottoms of said swells and open-ended couplings fixed in said apertures, as shown and described, for the purposes stated.

6. In a boiler-furnace, a boiler-section having a fire-pot in its center, a grate at the bottom of the fire-pot and a boiler-section on top of the fire-pot provided with a central combustion-chamber and a passage-way to admit fuel and a door to swing horizontally and an opening in the door to admit a deflector projecting inward and upward from the bottom of the door and a draft-door hinged in the opening of said door to swing vertically, a plurality of communicating boiler-sections on top of the boiler-section having a central combustion-chamber and a plurality of tubes connected with said boiler-section to extend horizontally across the bottom of said combustion-chamber and connected with the boiler-section that closes the top of said chamber, all arranged and combined to operate in the manner set forth for the purposes stated.

7. In a boiler-furnace, a plurality of overlying boiler-sections each having integral outward swells and coinciding openings in the swells and flanges at the lower and upper boiler-sections provided with coinciding perforations and rods fixed in said apertures in the flanges, arranged and combined as shown and described for the purposes stated.

8. A boiler-furnace comprising a lower portion having an integral interior annular flange adapted to support a grate, a grate fitted on top of said flange, a boiler-section having a central open-ended fire-pot or combustion-chamber, a boiler-section having an interior open-ended fuel-chamber, a grate composed of a plurality of tubes extended across the top of the combustion-chamber and their ends connected with the said two boiler-sections, a plurality of boiler-sections having integral outward swells and openings in coinciding positions communicating with each other, means for fixing said boiler-sections together in overlying positions, a dome on the top of the upper boiler-section, a smoke-flue connected with the dome, induction-tubes connected with the lower boiler-section and eduction-tubes connected with the upper boiler-section, all arranged and combined to operate in the manner set forth for the purposes stated.

JOSEPH T. ROBBINS.

Witnesses:
R. H. ORWIG,
THOMAS G. ORWIG.